(12) United States Patent
Ajiki et al.

(10) Patent No.: US 6,700,751 B2
(45) Date of Patent: Mar. 2, 2004

(54) MULTI-CHANNEL MAGNETORESISTIVE HEAD DEVICE

(75) Inventors: Satoshi Ajiki, Yamagata (JP); Hiroaki Tobitsuka, Yamagata (JP); Koichi Hosoya, Yamagata (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 198 days.

(21) Appl. No.: 09/841,594

(22) Filed: Apr. 25, 2001

(65) Prior Publication Data

US 2001/0036042 A1 Nov. 1, 2001

(30) Foreign Application Priority Data

Apr. 28, 2000 (JP) ..................... P.2000-130400

(51) Int. Cl.[7] ................................ G11B 5/00
(52) U.S. Cl. ..................................... 360/316
(58) Field of Search ................... 360/315, 316, 360/76, 314, 322

(56) References Cited

U.S. PATENT DOCUMENTS

| | | | | | |
|---|---|---|---|---|---|
| 4,523,243 A | * | 6/1985 | Billington | .............. | 360/327.24 |
| 4,717,979 A | * | 1/1988 | Washisu | ...................... | 360/316 |
| 4,988,850 A | * | 1/1991 | Masuda et al. | ............. | 235/449 |
| 5,208,714 A | * | 5/1993 | Denison et al. | ............. | 360/316 |
| 5,210,667 A | * | 5/1993 | Zammit | ...................... | 360/316 |
| 5,734,532 A | * | 3/1998 | Kobayashi et al. | ......... | 360/316 |
| 5,883,760 A | * | 3/1999 | Yamada et al. | ............... | 360/76 |

* cited by examiner

Primary Examiner—Brian E. Miller
(74) Attorney, Agent, or Firm—Whitham, Curtis & Christofferson, P.C.

(57) ABSTRACT

A plurality of magnetoresistive heads are arranged on a wafer substrate. A plurality of electrode pads are arranged on the wafer substrate in a first direction. Each electrode pad is connected to an associated magnetoresistive head. Respective adjacent electrode pads are shifted from each other in a second direction perpendicular to the first direction. The shifted amount of the adjacent pads in the second direction is larger than a dimension of the electrode pad in the second direction.

6 Claims, 3 Drawing Sheets

MULTI-CHANNEL MAGNETORESISTIVE HEAD DEVICE

BACKGROUND OF THE INVENTION

The present invention relates to a multi-channel magnetoresistive head device using a lot of magnetoresistive heads which read information from a magnetic recording medium by using magnetoresistive films.

The magnetoresistive heads (hereinafter called as MR heads) utilizing magnetoresistance effect have been widely used in order to reproduce information recorded on magnetic recording medium such as hard discs, video tapes etc. In recent years, the tendency to the multi-channels of the MR heads have been grown due to the development of the micro-fabrication technique of semiconductors.

FIG. 4 is a diagram showing a multi-channel magnetoresistive head device 11. As shown in FIG. 4, the multi-channel MR head device 11 includes a wafer substrate 12, a plurality of MR heads 13 (13-1, 13-2, 13-3, . . .) formed on the wafer substrate 12, and a plurality of electrode pads 14, 16 electrically coupled to MR elements and coils constituting the MR heads 13, respectively. The electrode pads 14, 16 are electrically coupled to a plurality of electrode pads 17, 19 provided on a flexible printed board 40 through wires 15, 18, respectively.

In this multi-channel MR head device 11, the MR heads 13 are disposed so as to oppose to a magnetic recording medium such as a hard disc, a video tape etc. on which predetermined information is magnetically recorded, whereby the information recorded on the recording medium is read by utilizing the change of the resistance values of the MR elements while supplying a predetermined current to the MR elements constituting the MR heads 13. The signals read from the MR elements are supplied through the flexible printed board 40 to a predetermined circuit within the main body of a recording/reproducing apparatus such as a hard disc drive, a video tape recorder etc. in which the multi-channel MR head device 11 is provided.

In the multi-channel MR head device 11 shown in FIG. 4, in order to supply the current to the respective MR elements constituting the MR heads 13 and supply signals read from the respective MR elements to the circuit within the main body of the recording/reproducing apparatus, two electrode pads 14 are provided in correspondence to each of the MR elements and two electrode pads 16 are provided in correspondence to each of coils used for recording on the recording medium. In such a multi-channel MR head device 11, when the number of channels is increased, that is, when the number of the MR heads 13 is increased, it is required to increase the number of the electrode pads 14, 16 as four times as the increase of the number of the MR heads. In this case, since the width of the substrate 12 is restricted, it is required to form the electrode pads 14, 16 so as to reduce the areas thereof.

The electrode pads 14 and the electrode pads 16 are usually coupled to the wires 15 and the wires 18 through use of the wire bonding, respectively. However, when the area of each of the electrode pads 14, 16 becomes narrower, it becomes difficult to perform such wire bonding procedure and so the efficiency of the procedure degrades.

On the other hand, when the area of each of the electrode pads 14, 16 is secured to a certain value, the number of the electrode pads 14, 16 which can be formed on the substrate of the same size is reduced. Thus, the number of the MR heads 13 which can be formed on the substrate reduces and so a desired number of the channels can not be obtained. Further, when the size of the substrate is made larger, the size of the multi-channel MR head device 11 itself becomes larger, so that it is not desirable for the apparatus which is required to be miniaturized.

SUMMARY OF THE INVENTION

The invention has been made in view of the aforesaid problems, and an object of the invention is to provide a magnetic head device which can increase the number of electrode pads formed on a substrate with a predetermined size without reducing the size of each of the electrode pads.

In order to achieve the above object, according to the present invention, there is provided a multi-channel magnetoresistive head device, comprising:

a wafer substrate;

a plurality of magnetoresistive heads arranged on the wafer substrate;

a plurality of electrode pads arranged on the wafer substrate in a first direction, and each electrically connected to an associated magnetoresistive head;

wherein respective adjacent electrode pads are shifted from each other in a second direction perpendicular to the first direction.

Preferably, the shifted amount of the adjacent pads in the second direction is larger than a dimension of the electrode pad in the second direction.

Preferably, the head device further comprises a flexible printed board, on which a plurality of electrode pads are arranged in a third direction. Each of the electrode pads on the flexible printed board is electrically connected to an associated electrode pad on the wafer substrate. Respective adjacent electrode pads are shifted from each other in a fourth direction perpendicular to the third direction.

Preferably, the shifted amount of the adjacent pads in the fourth direction is larger than a dimension of the electrode pad in the fourth direction.

In the above configurations, much more electrode pads can be formed on a substrate having a predetermined area, without reducing the area of each of the electrode pads. Therefore, the invention can cope with the increase of the channels of the multi-channel magnetoresistive head device. Further, since it is not necessary to reduce the area of each of the electrode pads, the working efficiency of the wire bonding etc. can be well maintained.

DETAILED DESCRIPTION OF THE PREFERRED EMBODIMENTS

A multi-channel magnetoresistive head device according to one embodiment of the invention will be explained in detail with reference to the accompanying drawings.

Figure 1:
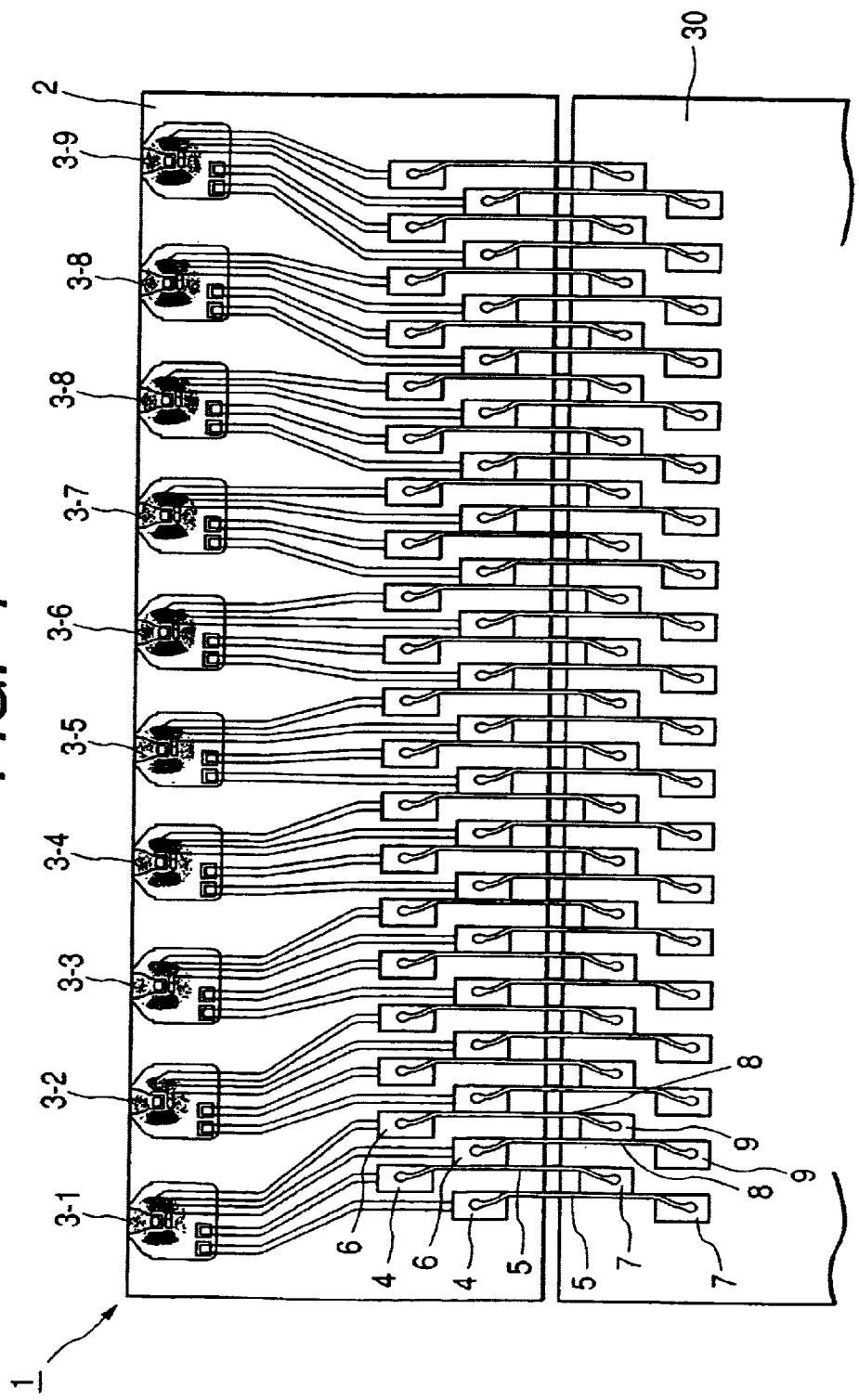
FIG. 1 is a plan view of the multi-channel magnetoresistive head device according to one embodiment of the invention.

FIG. 1 is a plan view of the multi-channel magnetoresistive head device (hereinafter merely called as an MR head device) 1. The MR head device 1 includes a wafer substrate 2 cut out in a plate of almost rectangular shape, a plurality of multi-channel magnetoresistive heads (hereinafter merely called as MR heads) 3 (3-1, 3-2, . . . , 3-9) formed on the element forming surface of the wafer substrate 2 in a line with a predetermined interval by using the well known method, and a plurality of electrode pads 4, 6 coupled through a low-resistance metal pattern to predetermined electrodes of the MR heads 3, respectively.

In the MR head device 1, as described later, in order to supply a predetermined current to the respective MR elements constituting the MR heads 3 and to detect the changes of the resistance values of the MR elements, two electrode pads 4 are provided in correspondence to each of the MR elements and two electrode pads 6 are provided in correspondence to each of coils used for recording on a recording medium. The plurality of the electrode pads 4, 6 are disposed in a manner that the adjacent ones thereof are shifted to each other in a direction perpendicular to a direction in which the electrode pads 4 and 6 are arranged.

The MR head device 1 is provided with a flexible printed board 30 for supplying a predetermined current to the MR elements constituting the MR heads 3 or for supplying signals read from the MR elements to a predetermined circuit provided within a recording/reproducing apparatus such as a hard disc drive, a video tape recorder etc. comprising the MR head device 1. Electrode pads 7, 9 of the same number as the electrode pads 4, 6 provided on the wafer substrate 2 are formed on the flexible printed board 30. The electrode pads 7, 9 are electrically coupled to the electrode pads 4, 6 provided on the wafer substrate 2 through wires 5, 8, respectively. Like the electrode pads 4, 6, these plurality of electrode pads 7, 9 are also disposed in a manner that the adjacent electrode pads are shifted to each other in a direction perpendicular to a direction in which the electrode pads 7, 9 are arranged.

Figure 2:
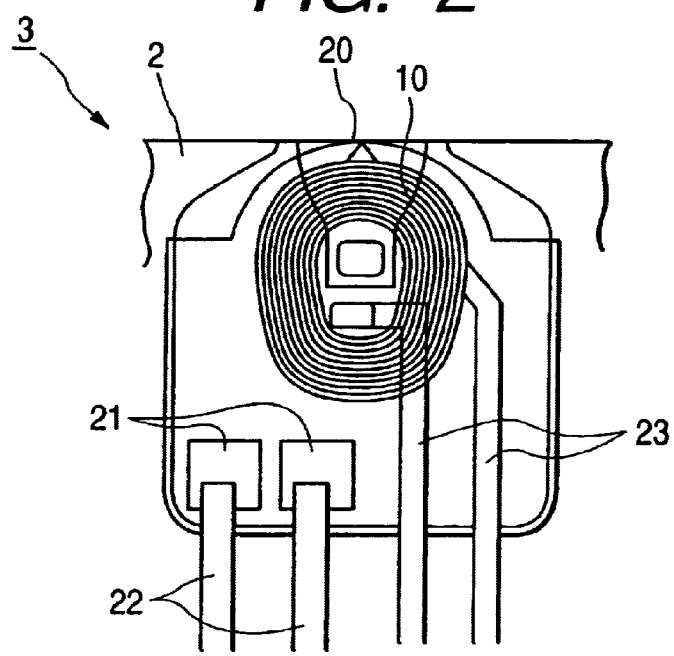
FIG. 2 is an enlarged plan view of a head element of the multi-channel magnetoresistive head device shown in FIG. 1.

FIG. 2 is an enlarged plan view of the MR head 3 of the MR head device 1 shown in FIG. 1. Although not shown, an MR element 20 is formed at a position of the wafer substrate 2 facing on a recording medium and is electrically coupled to electrode pads 21. Further, the electrode pads 21 are electrically coupled to the electrode pads 4 through electrode wirings 22. Data recorded on the recording medium is detected by flowing current to the electrode pads 4 and converting the change of the magnetic field to the resistance value of the head by utilizing the magnetoresistance effect. The coil 10 serves to record on the recording medium and is electrically coupled to the electrode pads 6 through electrode wirings 23. In the coil 10, the electrode pads 21 and the electrode wirings 22, 23, low-resistance metal films made of copper (Cu), gold (Au) etc. are used.

As described above, the electrode pads 4, 6 are electrically coupled to the electrode pads 7, 9 of the flexible printed board 30 through the wires 5, 8, respectively. The flexible printed board 30 is further coupled to the predetermined circuit. According to such a wiring structure, the MR element 20 is supplied with the current, and the predetermined circuit is supplied with the signal representing the change of the resistance value of the MR element 20, that is, the signal representing the data detected by the MR element 20 from the magnetic recording medium such as a hard disc, a video tape etc.

Figure 3:
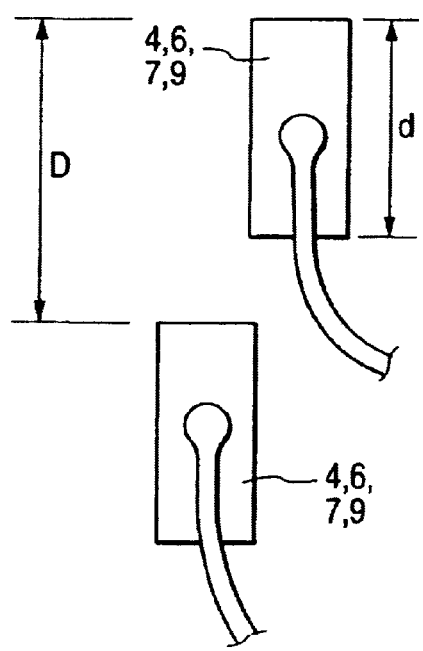
FIG. 3 is a diagram for explaining a shift amount of adjacent electrode pads in the magnetoresistive head device.

In the MR head device 1, as described above, the plurality of electrode pads 4, 6 provided on the wafer substrate 2 are formed in a zigzag fashion, that is, formed in a manner that the adjacent electrode pads 4, 6 are shifted to each other to the direction perpendicular to the arrangement direction thereof. As shown in FIG. 3, the shifted amount D is set so as to be larger than at least the longitudinal length dimension d of the electrode pads 4, 6, that is, the size of the electrode pads along the direction perpendicular to the arrangement direction of the electrode pads so that the adjacent electrode pads 4, 6 do not overlap to each other even when the width of the electrode pads 4, 6 is made larger. Thus, the width of the electrode pads 4, 6 can be made larger and the electrode pads 4, 6 each having a desirable area can be formed.

Figure 4:
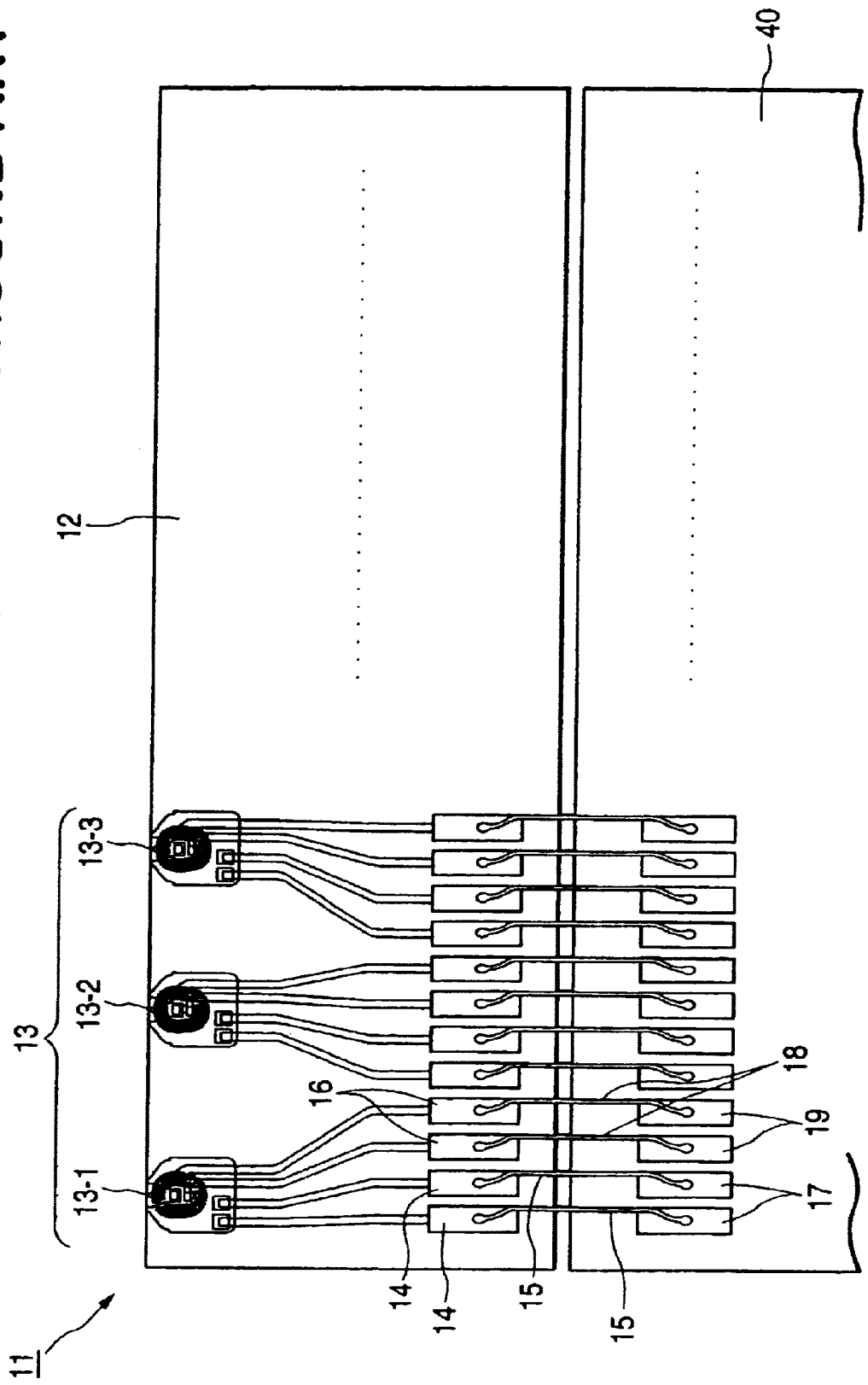
FIG. 4 is a plan view of a related multi-channel magnetoresistive head device.

That is, according to the embodiment, the two electrode pads 4 are provided with respect to the single MR element 20 and the two electrode pads 6 are provided with respect to the single coil 10. When the number of the MR heads 3 is increased in accordance with the tendency to the multi-channel of the MR head device 1, the electrode pads 4, 6 having the number four times as large as that of the MR heads are required. According to the invention, since the electrode pads 4, 6 of the constant areas can be formed much more than the related device shown in FIG. 4 without enlarging the size of the wafer substrate 2, the invention can cope with the increase of the channels of the MR head device 1.

On the other hand, in this embodiment, like the electrode pads 4, 6 formed on the wafer substrate 2, the electrode pads 7, 9 provided on the flexible printed board 30 are formed in a manner that the adjacent electrode pads 7, 9 are shifted to each other to the direction perpendicular to the arrangement direction of the electrode pads 7, 9. Thus, also in the flexible printed board 30, the more electrode pads 7, 9 can be formed without reducing the area of each of the electrode pads 7, 9.

The shifted amount of the electrode pads 7, 9 can be explained similarly to the electrode pads 4, 6, as shown in FIG. 3.

The electrode pads 4, 6 on the wafer substrate 2 are electrically coupled to the electrode pads 7, 9 on the flexible printed board 30 through the wires 5, 8, respectively. The wires 5 are wired to the electrode pads 4 and the electrode pads 7 through use of the wire bonding and also the wires 8 are wired to the electrode pads 6 and the electrode pads 9 through use of the wire bonding. At the time of the wiring, when the are of each of the electrode pads is narrow, there arises a problem that the efficiency of the wiring procedure is degraded and the coupling failure etc. is likely to occur. However, as described above, according to the invention, since the area of each of the electrode pads 4, 6, 7, 9 can be formed larger, the efficiency of such bonding procedure can be improved and the failure ratio such as coupling failure etc. can be reduced.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A multi-channel magnetoresistive head device, comprising:
   a wafer substrate,
   a plurality of magnetoresistive heads arranged on the wafer substrate in a first direction, and each electrically connected to and associated magnetoresistive head, wherein respective adjacent electrode pads are shifted from each other in a second direction perpendicular to said first direction; and a flexible printed board, on which a plurality of electrode pads are arranged in a third direction, wherein each of the electrode pads on the flexible printed board is electrically connected to an associated electrode pad on the wafer substrate, and respective adjacent electrode pads are shifted from each other in a fourth direction perpendicular to said third direction.

2. The head device as set forth in claim 1, wherein the shifted amount of the adjacent pads in the second direction is larger than a dimension of the electrode pad in the second direction.

3. The magnetoresistive head device as set forth in claim 1, wherein two of the electrode pads are electrically connected to either one of the magnetoresistive elements or one of the coils.

4. The magnetoresistive head as set forth in claim 1, wherein each of the coils is formed on a surface of the wafer substrate.

5. The head device as in claim 1, wherein the third direction aligns with the first direction, and the fourth direction aligns with the second direction.

6. The head device as in claim 1, wherein the pads arranged on the wafer substrate in the first direction are wired to respective pads on a flexible printed board, and the pads in the second direction are wired to respective pads on a flexible printed circuit board.

* * * * *